O. STALHANE AND O. O. KRING.
ELECTRIC SOLDERING IRON.
APPLICATION FILED APR. 3, 1919.
1,345,645.
Patented July 6, 1920.
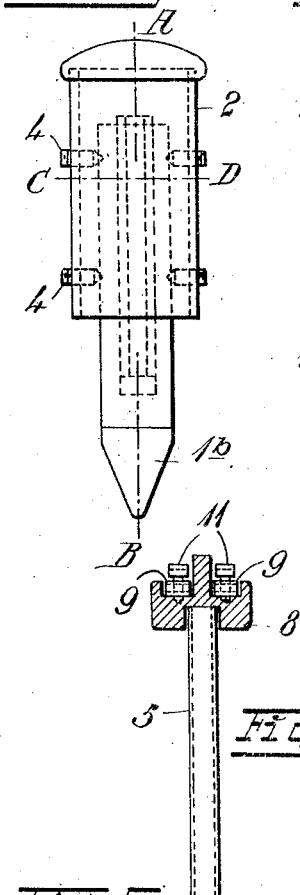
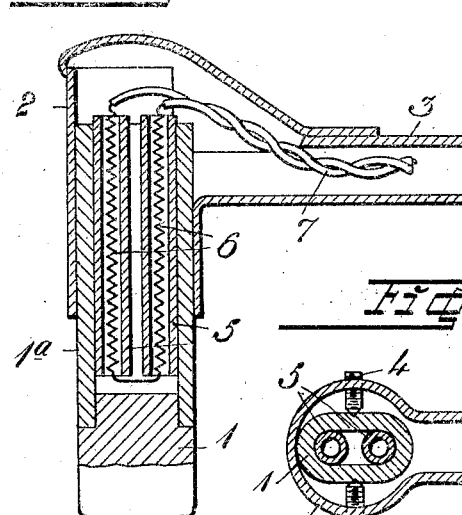
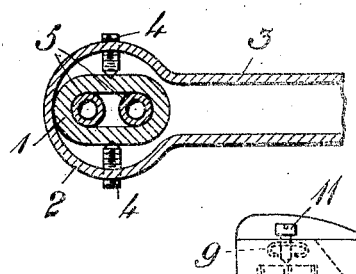
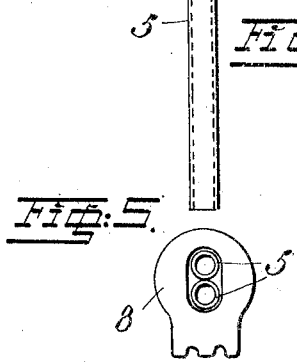
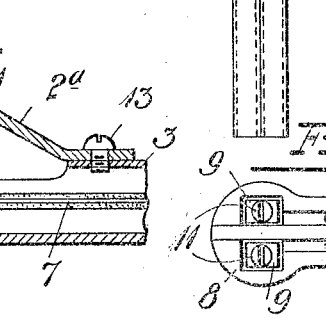
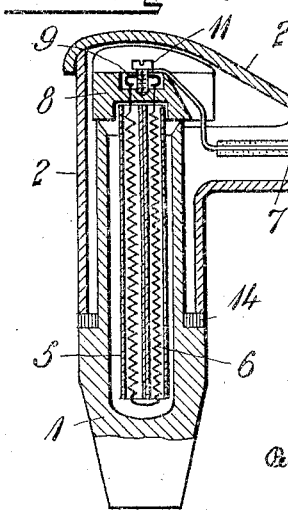
Otto Stålhane,
Olof Oskar Kring,
Inventors.
Pennie, Davis, Marvin & Edmonds,
Attorneys.

UNITED STATES PATENT OFFICE.

OTTO STÅLHANE AND OLOF OSKAR KRING, OF DJURSHOLM, SWEDEN.

ELECTRIC SOLDERING-IRON.

1,345,645.  Specification of Letters Patent.  Patented July 6, 1920.

Application filed April 3, 1919. Serial No. 287,327.

*To all whom it may concern:*

Be it known that we, OTTO STÅLHANE and OLOF OSKAR KRING, engineers, subjects of the King of Sweden, residing in Djursholm, in the Kingdom of Sweden, have invented certain new and useful Improvements in Electric Soldering-Irons, of which the following is a specification.

The present invention relates to that kind of electric soldering irons where the heat-generating resistance element is placed in a chamber or cavity in the soldering bolt or iron itself. In hitherto known devices of this kind the actual resistance material, in the form of a metal wire or a metal band, has been embedded in an insulating refractory mass, or wound on a core of insulating material. Such devices have great drawbacks. Firstly in a resistance wire embedded in an insulating mass there is required a considerable super-temperature in the wire on account of the unfavorable transmission of heat, and secondly it is exposed to mechanical strains which gradually cause its rupture, owing to the fact that the wire and the insulating material as a rule have greatly varying coefficients of expansion.

In accordance with the present invention the resistance element is arranged in such a manner that these drawbacks are obviated, for which purpose the resistance element is made of metal wire or strips wound in a coil or other suitable form which resistance element is arranged in one or more tubes of refractory, electrically non-conducting material, placed in a cavity in the soldering bolt or iron itself. The tubes are preferably made of quartz glass, which is not injured by irregular heating and which, moreover, owing to the fact that it is transparent, facilitates the transmission of heat from the resistance wire to the iron by means of radiation. Another advantage of this arrangement resides in the fact that the heating element can be removed and replaced when desired. Furthermore the manufacture of soldering irons in accordance with this invention can be carried out in a more practical manner than in accordance with the old system.

In order to make plain the invention there are shown in the accompanying drawing by a way of example, two forms of the invention.

Figures 1-3 show one form of the invention and Figs. 4-8 show another form of a soldering iron with an exchangeable heating element in accordance with the present invention. The corresponding parts are provided with the same reference numbers in the different figures.

Fig. 1 shows the soldering iron, viewed from the front. Fig. 2 is a section along the line A—B in Fig. 1, and Fig. 3 is a section along the line C—D in Fig. 1. Fig. 4 shows a heating element in vertical section along the line A—B in Fig. 5, which shows the element in horizontal projection. Fig. 6 shows the element in vertical and Fig. 7 in horizontal projection. Fig. 8 shows the front part of the soldering iron in vertical section.

The invention is first described with reference to Figs. 1-3.

1 designates the soldering bolt or iron which may be made in one piece (see for example Fig. 8), but which according to Figs. 1-3 is shown composed of two parts, viz. a tubular part $1^a$ and a solid part or soldering edge $1^b$, made of copper or other suitable material. The upper part of the iron is surrounded by a protective casing 2, united with the shaft 3 of the bolt in which casing the bolt or soldering iron is held securely by means of the screws 4. The bolt 1 has an oval cross section, and is provided with a boring or excavation shaped in a corresponding manner, in which two quartz tubes 5 are inserted. In these quartz tubes are placed coils 6 (see Fig. 2, not shown in Fig. 3) of a suitable resistance material. The coils are connected with the inducting wire for the electric current passing out through the shaft.

The part $1^a$ is preferably made of a metal tube of suitable section, into the one end of which is fitted another metal part $1^b$, serving as actual soldering wedge or top of the bolt. By this arrangement several advantages are attained. First that part $1^b$ of the soldering iron, which gets consumed, is easily inter-changeable; secondly the part $1^a$ can be made merely by being cut out of a tube with a corresponding section; thirdly the interior of the bolt is easily accessible for the insertion of the coils; and finally a soldering bolt with this arrangement can be made with a minimum of weight and volume in proportion to its capacity.

Figs. 4-7 show a treating element detachable from the bolt and intended to be used in soldering bolts in accordance with the present invention. 5 are the refractory tubes, in some suitable manner fixed in an attachment 8 of porcelain, fire clay or other refractory or heat-resisting material, on which also two or more electric contacts 9 with set-screws are placed. The ends of the resistance coils are connected to these contacts. Together these parts form a heating element which can be easily inserted in the cavity of the actual soldering bolt or soldering iron.

In Fig. 8, 1 designates the soldering iron placed in the holder 2 or the casing, and provided with inner cavity or chambers 12, in which the said heating element is inserted. The holder 2 is provided with a lid 2ª, which is securely held by means of the screw 13, and which retains the heating element in its true position within the bolt. In the prolongation 3 of the holder serving as a shaft are arranged conducting wires 7 for the supply of current, which wires are connected with the contacts 9. 14 designates a ring of asbestos of similar heat-insulating material, which is arranged between the lower edge of the holder 2 and the soldering-iron 1, whereby transmission of heat from the latter to the holder is obviated and at the same time a steady connection between the parts is attained. The holder 2 and the soldering iron 1 may be fixed to one another by means of set-screws in a similar manner to that shown in Fig. 1.

It is obvious that a soldering iron in accordance with the present invention can be constructed in other ways than that shown in the drawing, while retaining the characteristic features of the invention. Thus the part 1ª may be made with, for example a circular cross-section, in which case it is most suitable to employ three insulating tubes. As in this case one end of the resistance wire wound in a coil will be inside the part 1ª at its end facing the part 1ᵇ, it is most suitable to lead out the connecting wire through the centrally situated channel, which arises between the three tubes. Naturally even more than three insulating tubes can be employed, and the part 1ª can be given another suitable cross section than those above indicated.

Having thus described our invention, we declare, that what we claim is:—

1. An electric soldering bolt or iron of the class described, consisting of a soldering bolt provided with a cavity or chamber, resistance heating elements arranged within a tube or tubes of refractory electrically insulating material inserted in the said cavity, said tube or tubes together with a resistance element forming together a technical unit removably arranged within said cavity.

2. An electric soldering bolt or iron of the kind described, consisting of a soldering bolt provided with a cavity or chamber, resistance heating elements arranged within a tube or tubes of refractory electrically insulating material inserted in the said cavity, said tube or tubes containing the resistance element being fastened to a holder of insulating material and removably inserted within the cavity or boring of the soldering bolt.

3. An electric soldering bolt or iron of the kind described, consisting of a soldering bolt provided with a cavity or chamber, resistance heating elements arranged within tube or tubes of refractory electrically insulating material inserted in the said cavity, said tube or tubes containing the resistance elements being fastened to a holder of insulating material and removably inserted within the cavity or boring of the soldering bolt, said holder being provided with contacts to which the terminals of the resistances are connected and provided with means for connecting conducting wires for supplying electric current to the same.

In testimony whereof, we affix our signatures.

OTTO STÅLHANE.
OLOF OSKAR KRING.

Witnesses:
 ALMA PETTERSSEN,
 AUG. HAGELIN.